(12) United States Patent
Mishra et al.

(10) Patent No.: US 10,745,280 B2
(45) Date of Patent: Aug. 18, 2020

(54) COMPACT THERMAL REACTOR FOR RAPID GROWTH OF HIGH QUALITY CARBON NANOTUBES (CNTS) PRODUCED BY CHEMICAL PROCESS WITH LOW POWER CONSUMPTION

(71) Applicants: Department of Electronics and Information Technology (DEITY), New Delhi (IN); Jamia Millia Islamia University, New Delhi (IN)

(72) Inventors: Prabhash Mishra, New Delhi (IN); Saikh Saiful Islam, New Delhi (IN)

(73) Assignees: Department of Electronics and Information Technology (DEITY), New Delhi (IN); Jamia Millia Islamia University, New Delhi (IN)

( * ) Notice: Subject to any disclaimer, the term of this patent is extended or adjusted under 35 U.S.C. 154(b) by 0 days.

(21) Appl. No.: 14/721,284

(22) Filed: May 26, 2015

(65) Prior Publication Data
US 2016/0348235 A1   Dec. 1, 2016

(51) Int. Cl.
*C23C 16/00* (2006.01)
*C01B 32/16* (2017.01)

(52) U.S. Cl.
CPC .................................. *C01B 32/16* (2017.08)

(58) Field of Classification Search
CPC ....................................................... C23C 16/26
USPC .......................................................... 118/715
See application file for complete search history.

(56) References Cited

U.S. PATENT DOCUMENTS

| | | | | |
|---|---|---|---|---|
| 4,520,430 A | * | 5/1985 | Long ..................... | B22F 3/1109 29/25.03 |
| 5,708,556 A | * | 1/1998 | van Os ............... | C23C 16/4586 361/234 |
| 5,891,251 A | | 4/1999 | MacLeish et al. | |
| 8,257,678 B2 | | 9/2012 | Steiner, III et al. | |
| 2003/0173338 A1 | * | 9/2003 | Vallance ............ | H01J 37/3056 219/121.2 |
| 2004/0101466 A1 | * | 5/2004 | Dillon ................... | B82Y 30/00 423/445 B |
| 2006/0057287 A1 | * | 3/2006 | Foss ....................... | B82Y 30/00 427/248.1 |
| 2007/0003471 A1 | | 1/2007 | Kawabata | |
| 2007/0110659 A1 | | 5/2007 | Hsiao | |
| 2007/0169702 A1 | * | 7/2007 | Khin Teo .......... | C23C 16/45565 118/725 |
| 2007/0251815 A1 | * | 11/2007 | Lo ....................... | C23C 14/0605 204/192.15 |
| 2008/0134975 A1 | * | 6/2008 | Gotthold ................ | F04B 37/08 118/723 VE |

(Continued)

*Primary Examiner* — Keath T Chen
(74) *Attorney, Agent, or Firm* — The Webb Law Firm

(57) ABSTRACT

The invention relates to a compact thermal reactor for rapid growth of high quality carbon nanotubes ($CNT_2$) produced by chemical process with low power consumption comprising: a processing chamber having a vacuum vessel, the vacuum vessel having a side cover formed of a first side wall and a second side wall, a top cover, a bottom cover connected to a support stand; feed through housing provided with a substrate; a heating system consisting of a heating element and back means; and at least one each inlet and outlet for gas injection into the process chamber for growing high quality carbon nanotubes over the substrate.

9 Claims, 4 Drawing Sheets

(56) References Cited

U.S. PATENT DOCUMENTS

| | | | |
|---|---|---|---|
| 2008/0176058 A1* | 7/2008 | Maschmann | B82Y 30/00 428/315.5 |
| 2008/0187648 A1 | 8/2008 | Hart et al. | |
| 2009/0078561 A1* | 3/2009 | Teo | B82Y 15/00 204/173 |
| 2009/0081113 A1* | 3/2009 | Jang | B01J 19/088 423/447.1 |
| 2010/0089869 A1* | 4/2010 | Bussan | B82Y 10/00 216/59 |
| 2010/0260933 A1 | 10/2010 | Malecki et al. | |
| 2011/0033639 A1 | 2/2011 | Coll et al. | |
| 2012/0220109 A1 | 8/2012 | Komori et al. | |
| 2012/0251432 A1 | 10/2012 | Cooper et al. | |
| 2012/0251433 A1 | 10/2012 | Gaillard et al. | |

* cited by examiner

COMPACT THERMAL REACTOR FOR RAPID GROWTH OF HIGH QUALITY CARBON NANOTUBES (CNTS) PRODUCED BY CHEMICAL PROCESS WITH LOW POWER CONSUMPTION

FIELD OF THE INVENTION

The present invention generally relates to a technique to achieve fast growth of carbon nanotube. More particularly, the present invention relates to a compact thermal reactor for rapid growth of high quality carbon nanotubes (CNTs) produced by a chemical process with lower power consumption.

BACKGROUND OF THE INVENTION

CNT is a well-known nanomaterial. Carbon nanotube, grapheme, 60, diamond are the carbon carbon bond allotropic profiled bodies. In 1991 Sumio Iijima found the size of the nanoscale multilayer hollow coaxial carbon nanotubes and published in nature. Due to nanoscale cylindrical structure and unique properties, carbon nanotubes have become promising materials.

For production of the CNTs many methods are known in the art, including arch-discharge and laser ablation method, and Chemical vapour deposition (CVD), CVD is a well-known method for producing of carbon nanotubes. In CVD system, hydrocarbon is used as a precursor. High temperature is required for cracking of catalyst to promote growth of carbon nanotubes. High temperature thermal cracking (800-120° C.) method is used to obtain high purity carbon nanotubes.

The temperature rate can be changed according to the type of hydrocarbon, for example, if acetylene (C2H2) is used over methane (CH4), the growth temperature is reduced. The growth temperature is an influencing parameter for design of a reaction chamber. In addition to the traditional high temperature thermal cracking solution, filament based thermal reactor for rapid growth of carbon nanotube, is also known.

The disadvantages of the commercially available Carbon nanotube growth system are:
1. Quartz tube based system.
2. The processes are costly.
3. Heating and Cooling rate very slow.
4. High process cycle time
5. High power consumption
6. Bigger in size.

Reference is made to U.S. Pat. No. 5,891,251, which discloses a multiple chamber CVD system for a single wafer. A reaction chamber inside a pressure vessel is heated by externally positioned RF induction coils. RF energy from the induction coils passes through the quartz tube to a graphite heating element present inside the reaction chamber. This provides substantially uniform heating by overcoming the problem of non uniform heating due to thickness of deposited layers formed on the walls of the reaction chamber in a CVD process.

Another reference can be made to Patent No. US 2007/003471 A1, wherein the use of functionalized hydrocarbons for CNT synthesis by CVD method is proposed. Hydrocarbon part of the compound acts as carbon source for CNT synthesis and the functional group remove the residual carbon impurities developed during the growth process.

U.S. Pat. No. 5,891,251 entitled 'CVD REACTOR HAVING HEATED PROCESS CHAMBER WITHIN ISOLATION CHAMBER' teaches a CVD reactor comprising a pressure chamber for maintaining a reduced pressure environment and a reaction chamber which is contained within and isolates process gas from the pressure chamber. The bell-jar shaped pressure chamber is designed to sustain a low-pressure environment. The parallel plate shaped reaction chamber can optimize the process gas flow. The design prevents deposition of process gases on the walls of the pressure chamber. A wafer is heated by induction coils external to the process chamber, which makes the heat transferred to wafer independent of deposition layers formed on the walls of the reaction chamber.

US Patent Publication No. 2012/220109 A1 entitled 'PLASMA CVD DEVICE AND METHOD OF MANUFACTURING SILICON THIN FILM' describes a plasma CVD device comprising a vacuum vessel that contains a discharge electrode plate and a ground electrode plate to which is attached a substrate for thin film formation. The CVD device also has a ground cover at an Interval from the discharge electrode. The discharge electrode and the ground cover has gas inlets and exhaust outlets for process gases. The reference also describes a method for manufacturing silicon thin film using the plasma CVD device. The device also has an electric potential control plate disposed at an Interval from the ground cover.

US Patent Publication No. 2007/0003471 A1 entitled 'A METHOD OF MANUFACTURING CARBON NANOTUBES' disclosed a method for manufacturing Carbon Nanotubes, in which carbon nanotubes are grown on a substrate by a chemical vapour deposition process using a reaction gas comprising a compound for carbon source, wherein the compound having a carbon skeleton and a functional group which is effective for removing carbon impurities that deposit during growth of carbon nanotubes, is used as a compound for the carbon source.

US Patent Publication No. 2010/0260933 A1 entitled 'APPARATUS AND METHOD FOR THE PRODUCTION OF CARBON NANOTUBES ON A CONTINUOUSLY MOVING SUBSTRATE' describes an apparatus with at least one carbon nanotubes growth zone having a substrate inlet sized to permit a windable length substrate to pass through. A heater is placed in thermal communication with the carbon nanotube growth zone, a feed gas inlet is provided. This apparatus helps in efficient production of carbon nanotubes on a continuously moving substrate.

US Patent Publication no. 2011/0033639 A1 entitled 'APPARATUS AND PROCESS FOR CARBON NANOTUBE GROWTH' describes an apparatus for the growth of high aspect ratio emitters or specifically manufacturing carbon nanotubes over a large surface area. The process involves subjecting a substrate to a pressure in the range of 10 to 100 Torr, providing a hydrocarbon gas to be used as source of carbon, heating the hydrocarbon gas by providing radiant heat within a range of 1500-3000 from a heating element which is made of a group consisting of carbon, and conductive ceramics. The apparatus also have a gas distribution element which help in even distribution of gas over the substrate.

US Patent Publication No., 2012/0251432 A1 entitled 'METHODS FOR THE PRODUCTION OF ALIGNED CARBON NANOTUBES AND NANOSTRUCTURED MATERIAL CONTAINING SAME' teaches a continuous method for producing a plurality of aligned carbon nanotubes which comprises depositing onto a continuously moving substrate a catalyst to initiate and maintain the growth of carbon nanotubes and a carbon bearing precursor and growing nanotubes inside of a CVD reactor at conditions that promote the growth of substantially aligned carbon nanotubes on the catalyst support material.

US Patent Publication No. 2012/0251433 A1 entitled 'PROCESS FOR FABRICATING CARBON NANOTUBES AND APPARATUS FOR IMPLEMENTING THE PROCESS' describes an industrial process for growth of carbon nanotubes (CNTs), comprising synthesis of carbon nanotubes by decomposing a carbon source brought into contact, in a fluidized bed reactor at a reaction temperature between 500-1500° C. with a catalyst I the form of substrate grains covered with a metal, the nanotubes produced being recovered sequentially by discharging them while hot at the reaction temperature for synthesizing the carbon nanotubes.

U.S. Pat. No. 8,257,678 teaches Systems and methods for formation of carbon-based nanostructures. In some embodiments the nanostructures may be formed on a nanopositor. The nanopositor can comprise, in some embodiments at least one of metal atoms in a non-zero oxidation state and metalloid atoms in a non-zero oxidation state. For example, the nanopositor may comprise a metal oxide, a metalloid oxide, a metal chalcogenide, a metalloid chalcogenide, and the like. The carbon-based nanostructures may be grown by exposing the nanopositor, in the presence of absence of a growth substrate, to a set of conditions selected to cause formation of carbon-based nanostructures on the nanopositor. In some embodiments, metal or metalloid atoms in a non-zero oxidation state are not reduced to a zero oxidation state during the formation of the carbon-based nanostructures. In some cases, metal or metalloid atoms in non-zero oxidation state do not form a carbide during the formation of the carbon-based nanostructures.

US 20070110659 discloses an apparatus for producing carbon nanotubes comprising a reaction chamber, a substrate holding member, and a driving member. The holding member is disposed inside the reaction chamber and is configures for holding a substrate for growing carbon nanotubes thereon the driving member is disposed in the reaction chamber and is configured for driving the holding member to move along a direction opposite to the growth direction of the carbon nanotubes in the reaction chamber.

US 20080187648 describes a method and apparatus providing controlled growth and assembly of nanostructures. A first substrate including at least one reaction site is provided. Energy is provided to the reaction site and a reaction species is introduced to the first substrate. A nanostructure is grown from the reaction site. The growth process of the nanostructure is controlled while continuously monitoring the properties of at least one of the nanostructure and the at least one reaction site, and by controlling process variables based on the monitored properties of the nanostructure and the at least one reaction site.

OBJECTS OF THE INVENTION

It is therefore an object of the present invention to propose a compact thermal reactor for rapid growth of high quality carbon nanotubes (CNTs) produced by chemical process with low power consumption, which eliminates the disadvantages of prior art.

A further object of the invention is to propose a compact thermal reactor for rapid growth of high quality carbon nanotubes (CNTs) produced by chemical process with low power consumption, which allows implementation on a simple technique for rapid increase of temperature for chemical processing in a chamber.

SUMMARY OF THE INVENTION

Accordingly, there is provided a compact thermal reactor for rapid growth of high quality carbon nanotubes (CNTs) produced by chemical process with low power consumption. The reactor comprises a process chamber and a Feed through housing attached with substrate. A heating element is provided for rapid increase of process temperature in the process chamber. An inlet and an outlet defines into the chamber for gas injection into the process chamber for growing high quality carbon nanotubes.

The heating system works in conjunction with the heating element with a back heating assembly. The electric feed through provides rapid temperature profile for deposition or growth process. One end of the reactor is connected to a supply gas for carbon nanotube formation and a plurality of exhaust outlets with pressure controller arrangement are provided in the process chamber.

BRIEF DESCRIPTION OF THE ACCOMPANYING DRAWINGS

In the drawings the specification are:

DETAILED DESCRIPTION OF THE INVENTION

Figure 1:
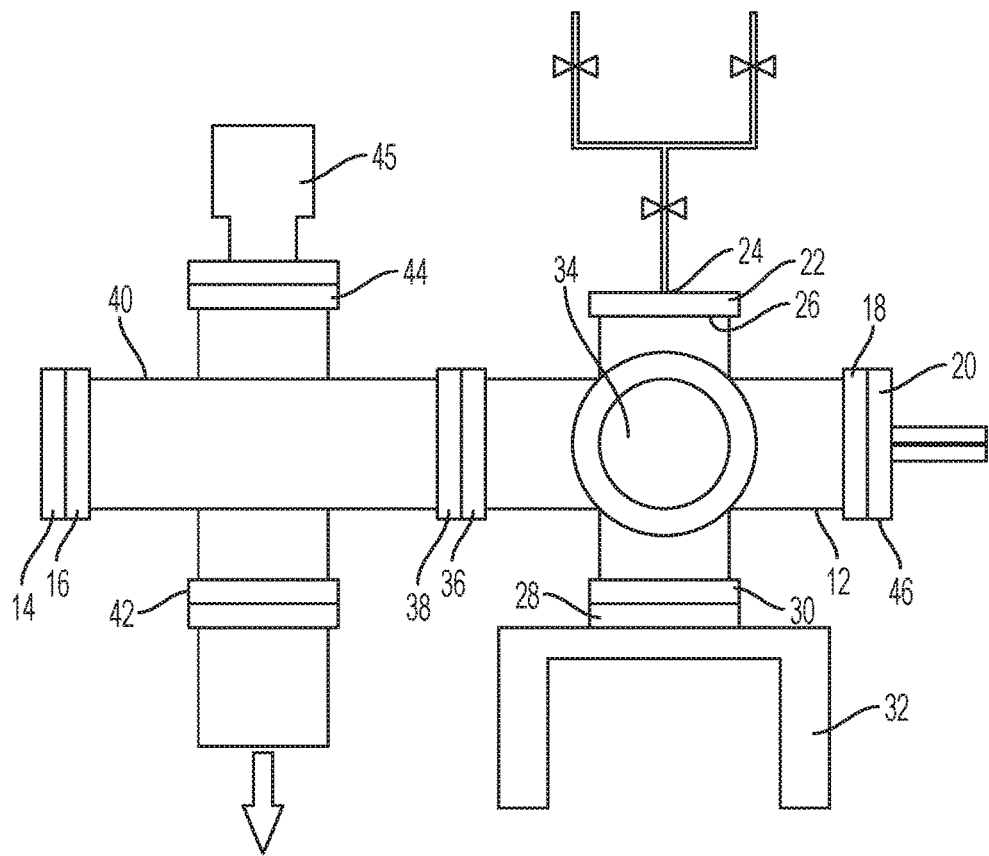
FIG. 1 shows a schematic of a processing chamber of the thermal reactor for rapid growth of carbon nanotubes according to the invention.
Figure 2:
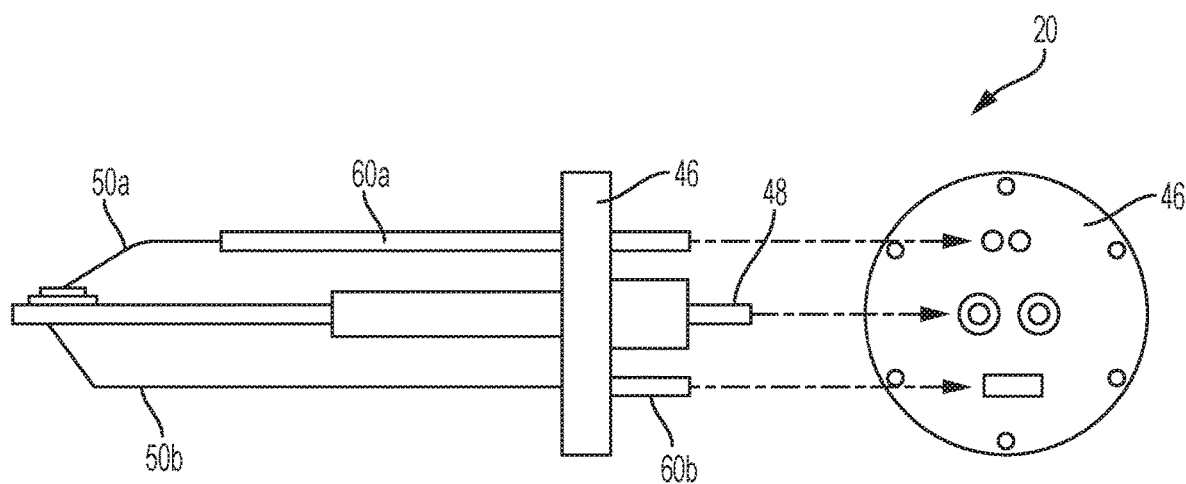
FIG. 2 shows a schematic of a feed through in the thermal reactor of the invention.
Figure 3A:
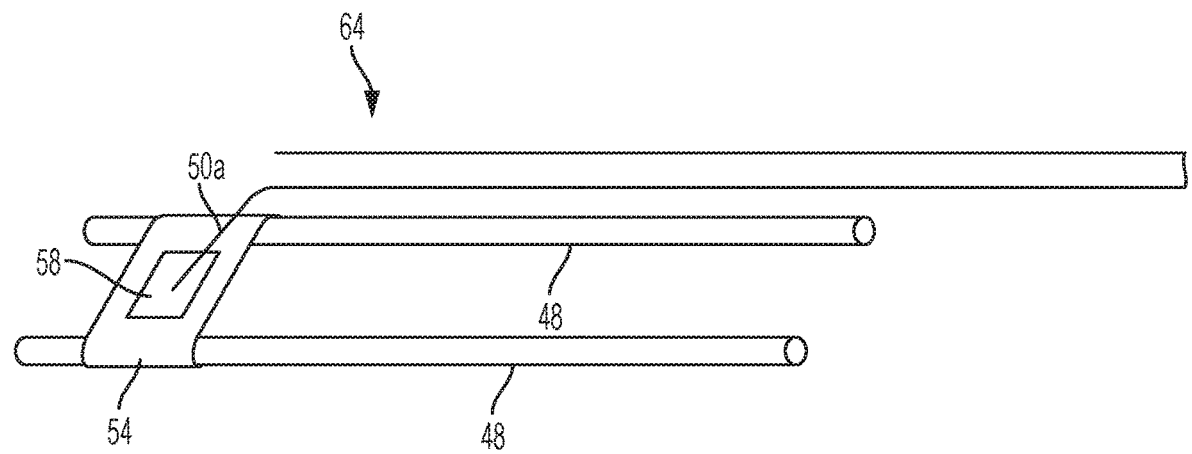
FIG. 3A shows a top schematic view of a heating element in the invention.
Figure 3B:
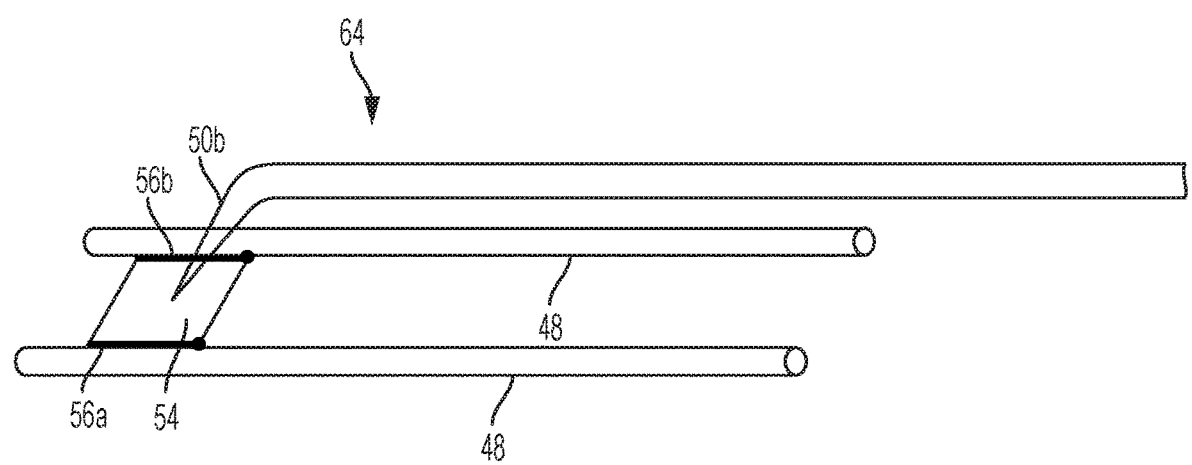
FIG. 3B shows a bottom schematic view of a heating element in the invention.
Figure 4:
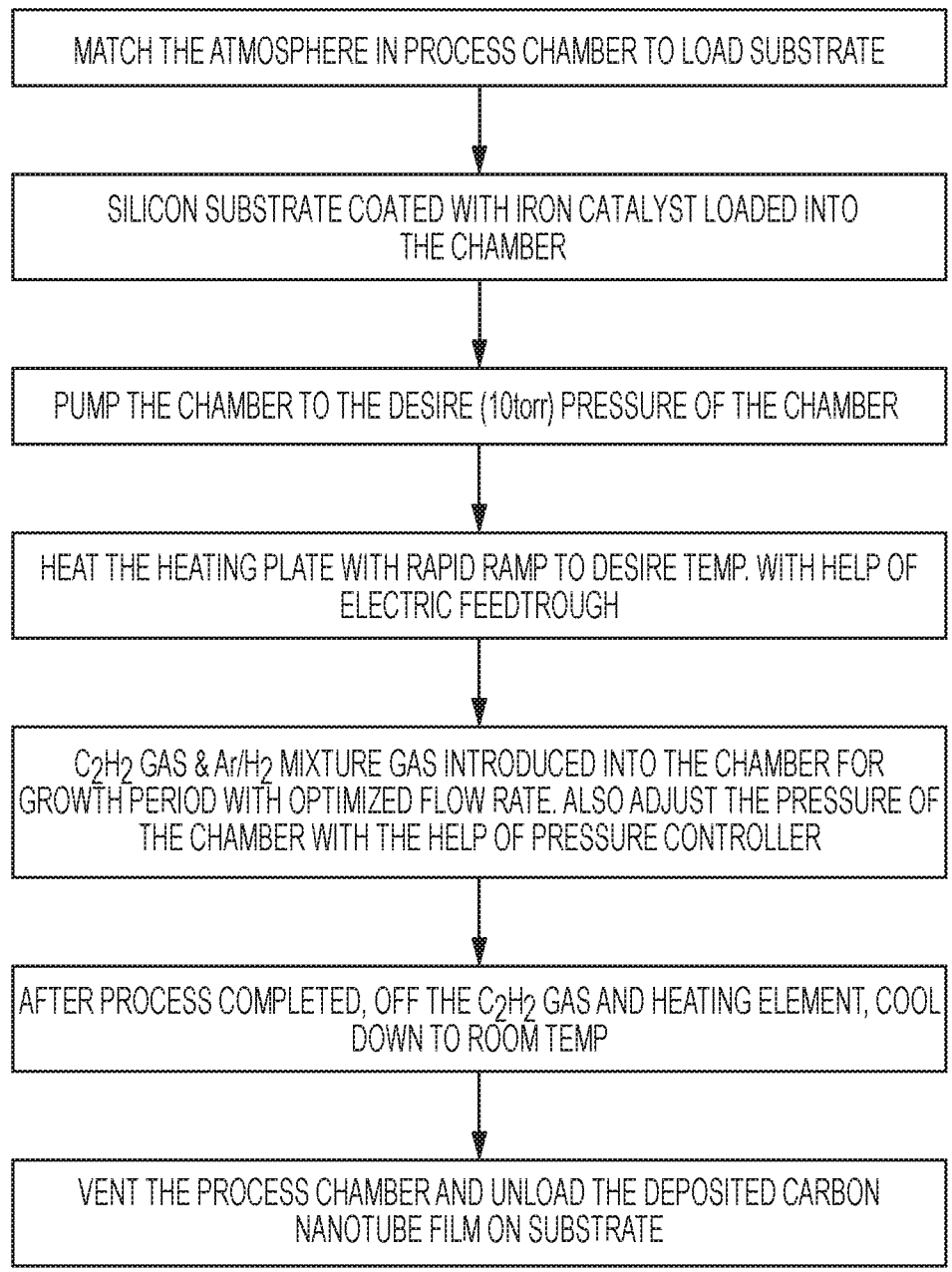
FIG. 4 shows the flow diagram of process performed in the thermal reaction of FIG. 1.
Figure 5B:
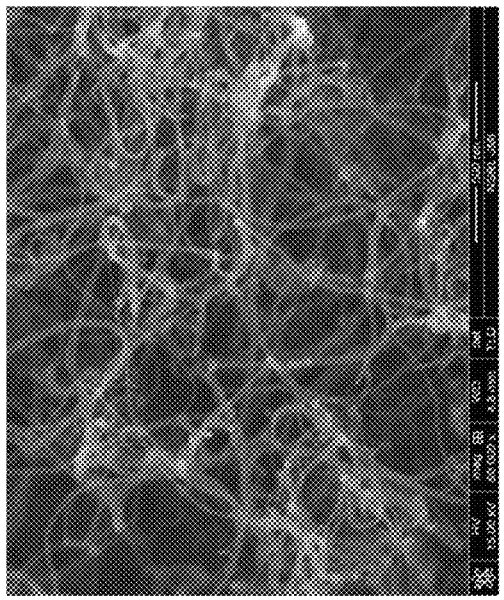
FIG. 5B is an SEM image of carbon nanotubes produced in the inventive thermal reactor.
Figure 5D:
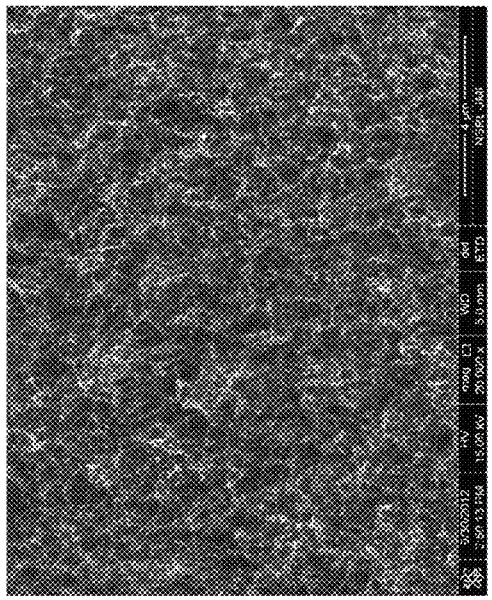
FIG. 5D is an SEM image of carbon nanotubes produced in the inventive thermal reactor.
Figure 5A:
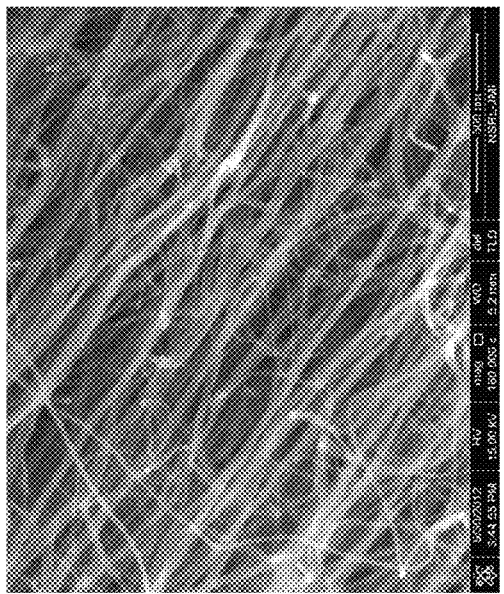
FIG. 5A is an SEM image of carbon nanotubes produced in the inventive thermal reactor.
Figure 5C:
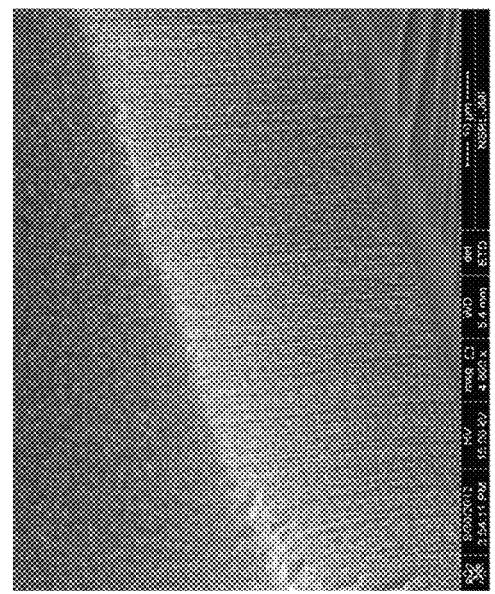
FIG. 5C is an SEM image of carbon nanotubes produced in the inventive thermal reactor.

FIGS. 1 to 3 describe the embodiment of a Thermal CVD device of the invention. The CVD device comprises a processing chamber which has a vacuum vessel 12. The vacuum vessel 12 is formed by a side cover 14 closing a first opening 16 at a first side wall of the vessel 12, a second opening 18 at a second wall covered with a feed through 20, a top cover 22 with a gas inlet 24 closing a third opening 26 at a top wall of the vessel 12, a bottom cover 28 closing a fourth opening 30 at a bottom wall of the vessel and connected to a stand 32 to support the vessel, a back cover (not shown) closing of fifth opening at a back wall of the vessel 12 and a front transparent glass 34 cover closing a sixth opening at front wall. There is a seventh opening 36 which is connected with a first end 38 of a gas outlet vessel 40, a second end of the gas outlet vessel, an eighth opening 42 provided to connect a vacuum pump, a ninth opening (not shown) on the side wall of the gas outlet vessel connected to a pressure controller, a tenth opening 44 on the side wall of the gas outlet vessel connected to a pirani gauge 45 which is connected to a display to indicate the pressure inside the chamber. A gas inlet 24 at the top cover of the vacuum vessel 12 is connected to two mass flow controllers (MFCs) which control the flow rates. The feed through has a flange 46, which is connected with a pair of copper rods 48, which are used for electrical inputs. The copper rods 48 are each connected to a tantalum wire, 56a, 56b.

At the ends of the copper rods 48 between the two parallel wires 56a, 56b, a tantalum foil 54 is placed which acts as a substrate holder. At the top of the tantalum foil 54, a thin wire 50a is placed to support the substrate 58 over the foil 54. This thin wire 50a is connected to a metal rod 60a. The metal rod 60a is connected to the flange 46. The rear side of the tantalum foil 54 is connected with a thin wire 50b. The thin wire 50b is connected to a metal rod 60b, to act as an input for a K-type thermocouple. FIG. 2 shows an example of a feed through 20 for the sample mounting and power supply for rapid heating. The feedthrough consists of two Cu electrodes 48 and the K-type thermocouple rod 60b. FIG. 3 shows an example of a heater 64 or heating arrangement in the chamber. The heating element 64 is made of the tantalum wires 56a, 56b and foil 54 using a spot welding.

Example 1

A substrate made of silicon with iron ($F_e$) catalyst deposited over it, for forming CNTs thereon, is mounted on the upper surface of the heating plate of the rapid thermal reactor (shown in FIG. 1). A regulated power supply was connected with the heating element via the Feedthrough electrode. The temperature of the heating plate was set at 800° with rapid temperature slope i.e. 40° C./Sec. The temperature of the surface of the substrate was measured by a K-type thermocouple. Diameter of the gas exhaust hole was set corresponding to the desired (10 torr) pressure of the chamber. Subsequently $C_2H_2$ gas and Ar/H2 mixture gas was introduced into the camber for a period of 3 min. with a flow rate of 40 sccm and 30 sccm respectively by a mass flow controller. The exhaust from the exhaust hole is used to adjust the pressure in the chamber for forming a high quality carbon nanotubes on the substrate.

Example 2

High quality carbon nanotube was formed on the substrate under the same conditions as those of Example 1 except that the flow rate of $C_2H_2$ gas was changed to 30 sccm.

Example 3

A substrate made of $SiO_2$/Si with iron (Fe) catalyst deposited over it for forming CNTs was mounted on the upper surface of the heating plate of the rapid thermal reactor (shown in FIG. 1). A regulated power supply was connected with the heating element via the Feedthrough electrode. The temperature of the heating plate was set at 850° C. with a rapid temperature slope, i.e., 40° C./Sec. and the temperature of the surface of the substrate was measured by a K-type thermocouple.

The diameter of the gas exhaust hole was set corresponding to the desired (10 torr) pressure of the chamber. Subsequently, $C_2H_2$ gas and Ar/$H_2$ mixture gas were introduced into the chamber for a period of 10 min. with a flow rate of 60 sccm and 30 sccm, respectively, by a mass flow controller. The exhaust from the exhaust hole was used to adjust the pressure in the chamber for forming vertically aligned carbon nanotube on the substrate.

A substrate made of $SiO_2$/Si with Fe—Mo metals (thickness: 05 nm) on Al metal (thickness: 10 nm) used as a supporting layer deposited over it was used for forming CNTs. The substrate was mounted on the upper surface of the heating plate of the rapid thermal reactor (shown in FIG. 1). A regulated power supply was connected with the heating element via a Feedthrough electrode. The temperature of the heating plate was set at 900° C. with rapid temp slope, i.e., 40°/Sec. under 500 torr pressure of the chamber. The temperature of the surface of the substrate was measured by a K-type thermocouple. The diameter of the gas exhaust hole was set corresponding to the desired (10 torr) pressure of the chamber. Subsequently, $C_2H_2$ gas and Ar/H2 mixture gas were introduced into the chamber for period of 2 min, with a flow rate of 30 sccm and 20 sccm, respectively, by a mass flow controller. The exhaust from the exhaust hole was used to adjust the pressure in the chamber for forming single wall carbon nanotube on the substrate.

We claim:

1. A thermal reactor for rapid growth of carbon nanotubes (CNTs) produced by a chemical process comprising:

a process chamber having a vacuum vessel, the vacuum vessel having a side cover covering a first opening in a first side wall, a removable feed through housing covering a second opening in a second side wall, a top cover covering a third opening in a top wall, and a bottom cover covering a fourth opening in a bottom wall and connected to a stand which supports the process chamber;

at least one inlet for gas injection into the process chamber, an opening outlet connected to a vacuum pump, and at least one outlet vessel for gas ejection from the process chamber, wherein the feed through housing comprises a flange to which is attached: (1) a tantalum metal foil heater attached to a pair of copper feedthrough electrodes to connect to a power supply, and (2) a thin wire is welded over the foil heater to support the substrate, the foil heater acts as a substrate holder, wherein attachment of the feed through housing to the vacuum vessel places the foil heater in the process chamber and removal of the feed through housing from the vacuum vessel removes the foil heater from the process chamber, and wherein the gas ejection from the process chamber is controlled to adjust pressure in the process chamber.

2. The reactor as claimed in claim 1, wherein the vacuum vessel further comprises at least one additional opening for connecting at least one of a pressure gauge, mass-flow controllers, pressure controllers, a vacuum pump, and a display device.

3. The rapid thermal reactor as claimed in claim 1, wherein a diameter of the at least one outlet is 0.72 to 1.456 inches (1.2 cm to 3.9 cm).

4. The rapid thermal reactor as claimed in claim 1, wherein the feed through housing and the second opening are substantially circular and a diameter of the second opening is 1.456 inches (3.7 cm).

5. The rapid thermal reactor as claimed in claim 1, wherein the reactor has a plurality of inlets and a diameter of each of the inlets is 0.18 inches (0.457 cm).

6. The rapid thermal reactor as claimed in claim 1, further comprising a substantially circular view port in the process chamber, a diameter of the view port being 1.456 inches (3.7 cm).

7. The rapid thermal reactor as claimed in claim 1, wherein the power supply is a DC power supply.

8. The reactor as claimed in claim 1, wherein a K-type thermocouple rigidly connected to the foil heater.

9. A method of manufacturing a carbon nanotube comprising the step of decomposing of carbon source gas by using the rapid thermal reactor as claimed in claim 1, connecting the electric feedthrough to the heating plate for supporting and heating a substrate for forming CNTs film thereon; and allowing deposition of carbon nanotube thin film on the substrate.

\* \* \* \* \*